July 17, 1934.  E. G. GREEN  1,967,055
PROCESS AND APPARATUS FOR CUTTING AND HANDLING SHEET GLASS
Filed Aug. 31, 1932
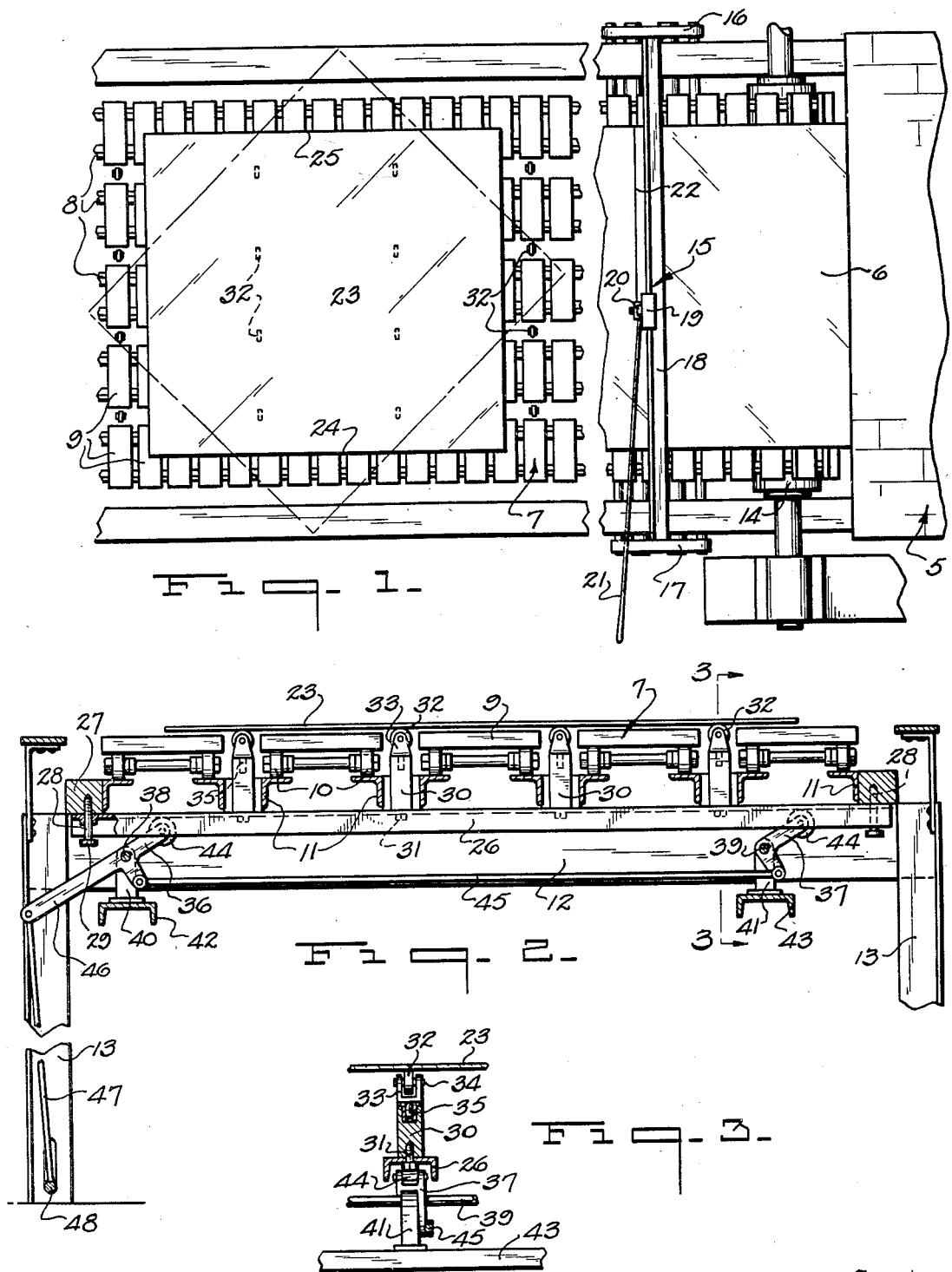
Inventor
EDWARD G. GREEN.
By Frank Fraser
Attorney Patented July 17, 1934

1,967,055

UNITED STATES PATENT OFFICE 1,967,055

PROCESS AND APPARATUS FOR CUTTING AND HANDLING SHEET GLASS

Edward G. Green, Charleston, W. Va., assignor to Libbey-Owens-Ford Glass Company, Toledo, Ohio, a corporation of Ohio Application August 31, 1932, Serial No. 631,252

6 Claims. (Cl. 49—48)

The present invention relates to an improved process and apparatus for cutting off and handling the sections of a continuously formed sheet or ribbon of glass at the outlet end of an annealing leer.

In the production of continuous sheet glass according to certain well known processes, the continuous sheet or ribbon of glass, after being formed, is carried horizontally through an annealing leer and emerges therefrom onto a socalled capping table upon which the said sheet or ribbon is first cut transversely into sheet sections, after which the opposite side edges of the individual sheet sections are trimmed off. Heretofore, it has been customary for a workman to be stationed at each side of the capping table for the purpose of trimming off the respective side edge of the sheet sections, one of said workmen also acting to cut the continuous sheet or ribbon transversely.

The principal aim and object of this invention resides in the provision of a process and apparatus wherein the opposite side edges of the individual sheet sections can be readily and conveniently trimmed off by a single workman stationed at one side of the capping table, to the end that the single workman can perform the same work heretofore requiring two workmen.

Another important object of the invention is the provision of a process and apparatus wherein the continuous sheet or ribbon of glass emerging from the annealing leer onto the capping table is first cut transversely into individual sheet sections and one edge thereof properly trimmed off by the workman, after which the sheet section is rotated horizontally approximately 180° while upon said table and the second side edge thereof trimmed off by the same workman.

Other objects and advantages of the invention will become more apparent during the course of the following description when taken in connection with the accompanying drawing.

In the drawing forming a part of this application and wherein like numerals are employed to designate like parts throughout the same, Fig. 1 is a plan view of apparatus constructed in accordance with the present invention, Fig. 2 is a transverse sectional view there through, and Fig. 3 is a detail section taken substantially on line 3—3 of Fig. 2.

Referring now to the drawing, the numeral 5 designates the outlet end of a horizontal annealing leer of any conventional or preferred construction, and 6 a continuous sheet or ribbon of glass emerging therefrom. Positioned closely adjacent the outlet end of said leer in a manner to receive the glass sheet therefrom and carry it forwardly is a moving cutting or capping table 7 which travels in the same direction and at the same speed as the continuous sheet 6. This table may take a variety of forms but is here shown by way of example as comprising a plurality of spaced parallel endless chains 8 carrying a series of wooden blocks 9 which form, in the upper run of the chains, a flat even supporting surface for the glass sheet. Each chain 8 has a series of rollers 10 which, in their upper run, travel on the fixed horizontal supporting tracks 11, said tracks being carried by a plurality of spaced parallel cross beams 12 supported at their opposite ends by the vertical legs 13. The endless chains 8 are trained at each end of their loop about a roller or drum 14, and one of these drums may be positively driven in any preferred manner to move the table 7 in the proper direction and at the desired speed.

As the continuous sheet or ribbon of glass 6 emerges from the leer 5 upon capping table 7, it is adapted to be first cut transversely into individual sheet sections of the desired length and for this purpose there may be provided the cutting mechanism designated in its entirety by the numeral 15. This cutting mechanism may be of any conventional or approved construction since the specific constructional details thereof form no part of the present invention. However, it is preferably of the general type disclosed in the patent to J. L. Drake, No. 1,724,261, granted August 13, 1929 and is adapted for movement with the sheet during the transverse scoring thereof whereby to permit accurate cuts to the end that the ribbon of glass can be cut transversely either to size or substantially to size.

The cutting mechanism 15 herein disclosed embodies generally a pair of carriages 16 and 17 arranged at opposite sides of the endless capping table 7 and movable longitudinally thereof upon suitable tracks, not shown, but which are located beneath the upper horizontal run of said table. Extending transversely across the table and connecting the carriages 16 and 17 is a supporting cross member 18 upon which is slidably mounted a cutter carrier 19 carrying the cutter 20. The cutter carrier 19 and cutter 20 are movable along the cross member 18 by an operating rod 21, and upon drawing of the said cutter across and in contact with the continuous sheet 6, it is adapted to effect the scoring thereof as indicated at 22. The glass ribbon is then broken along the score line 22 in the well known manner to provide individual sheet sections, one of which is shown at 23. Any suitable means may be employed for causing the cutting mechanism 15 to move with the glass sheet during the scoring of the latter.

After the continuous glass sheet or ribbon 6 has been cut transversely into individual sheet sections 23, it is customary to then trim off the opposite side edges 24 and 25 of each of said sections before removing the glass from the capping table 7. As set forth hereinabove, it has heretofore been the usual practice to provide a workman at each side of the capping table for trimming of the respective side edges of the sheet sections. According to the present invention, however, there is provided a process and apparatus whereby one of these workmen may be eliminated and wherein both side edges of the sheet sections can be trimmed therefrom by a single workman stationed at one side of the table. To these ends, there are provided a plurality of spaced parallel supporting members 26 extending transversely of the table 7 beneath the upper horizontal run thereof and carried at their opposite ends by wooden blocks 27 secured to the outer side rails 11. The supporting members 26 are connected to the wooden blocks 27 by vertical fastening elements 28 which pass upwardly through the said members and are threaded within the said blocks. The fastening elements 28 are of sufficient length to permit of a limited amount of vertical sliding movement of the supporting members 26 thereupon, the downward movement of said members being limited by collars or heads 29 carried by or formed integral with the said fastening elements at the lower ends thereof.

Carried by each of the transverse supporting members 26 are a plurality of spaced vertical supports 30 secured thereto as at 31. These supports are positioned between the adjacent series of wooden blocks 9 so as not to interfere with the travel of the capping table 7, and each carries at its upper end a freely rotatable roller or caster 32 carried by a bracket 33 and revolving upon a horizontal pin 34. The bracket 33 is provided with a vertical depending stem 35 which is loosely received within a recess in the upper end of the respective support 30. Thus, the rollers 32 are permitted to rotate freely upon pins 34 and can at the same time be caused to rotate bodily relative to the supports 30. In other words, the rollers 32 are freely rotatable about horizontal axes and also bodily rotatable about vertical axes.

As the continuous sheet or ribbon of glass 6 emerges from annealing leer 5, upon capping table 7, and before it has been cut transversely, the rollers or casters 32 are adapted to be located slightly beneath the upper surfaces of the wooden blocks 9 in the upper horizontal run of said table so as not to interfere with the forward movement of the sheet thereover. When the rollers 32 are so positioned, the supporting cross members 26 are carried upon the heads 29 of fastening elements 28. The continuous sheet is then adapted to be cut transversely as at 22 by the cutting mechanism 15 in the manner above described, after which one side edge of the individual sheet section 23, such as for instance edge 24, is trimmed off, it being of course understood that the same workman first cuts the ribbon transversely and then trims off the side edge 24 of the sheet section while stationed at one side of the capping table. After this has been done, the rollers 32 are elevated so that they project slightly above the upper surfaces of the wooden blocks 9 as clearly shown in Fig. 2, and when this is done, the individual sheet section 23 will naturally be supported thereupon. In other words, the sheet section will be transferred from the wooden blocks 9 to the rollers 32, and the forward movement thereof temporarily arrested. Due to the particular mounting of the rollers 32 whereby they are free to rotate about horizontal axes and also bodily about vertical axes, the workman, while positioned at the same side of the capping table, can easily and quickly swing the sheet section 23 around as indicated by the broken lines in Fig. 1 to reverse the relative positions of the side edges 24 and 25 and thus bring the edge 25 to a position where he can trim off the same while maintaining his position at the same side of the table. After both side edges of the sheet section have been trimmed, the rollers 32 are lowered to again bring the sheet to rest upon the wooden blocks 9 so that it may be carried along thereby. It will of course be readily appreciated that the continuous sheet emerging from the annealing leer is traveling at a relatively slow speed so that the workman will have sufficient time to cut the said ribbon transversely and then trim off the opposite side edges of the sheet section.

The means herein provided for raising each of the transverse supporting members 26, and consequently the rollers 32 carried thereby, includes the two bell crank levers 36 and 37 arranged beneath the supporting member adjacent the opposte ends thereof. The bell crank levers 36 and 37 are fixed intermediate their ends upon shafts 38 and 39 respectively carried by brackets 40 and 41 mounted upon channel beams 42 and 43. The shafts 38 and 39 extend longitudinally of the table and have associated therewith a similar pair of bell crank levers for each transverse supporting member 26. Carried at the upper end of each bell crank lever 36 and 37 is a freely rotatable roller 44 adapted to engage the under surface of supporting member 26, the opposite ends of said bell crank levers being connected together by a transverse connecting rod 45 so that the bell crank levers at opposite sides of the tables move in unison. One of the bell crank levers and, as here shown lever 36, is provided with a lever arm 46 to the outer end of which is pivoted a substantially vertical rod 47 having associated with the lower end thereof a foot pedal 48. When it is desired to raise the rollers 32 preparatory to turning the sheet around, it is simply necessary for the operator to press downwardly upon pedal 48 which will cause the bell crank levers 36 and 37 to be rotated so as to effect the raising of the transverse members 26 and, as a consequence, the said rollers 32. Upon the release of the pedal 48, the members 26 and rollers 32 will be caused to move downwardly by gravity.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass handling apparatus, means for supporting a moving sheet of glass, auxiliary sheet supporting means normally positioned beneath the level of the first mentioned supporting means, and means for effecting relative vertical movement between said first and second mentioned supporting means so as to transfer the sheet from the former to the latter, said second named supporting means including a plurality of rollers rotatable about horizontal axes, and means for mounting said rollers to turn bodily about vertical axes so that the sheet may be horizontally rotated while supported thereupon.

2. In sheet glass handling apparatus, means for supporting a moving sheet of glass, auxiliary sheet supporting means normally positioned beneath the level of the first mentioned supporting means, and means for effecting relative vertical movement between the first and second mentioned supporting means so as to transfer the sheet from the former to the latter, said second named supporting means including a plurality of supporting members arranged transversely beneath the first named supporting means, a plurality of rollers carried by said supporting members and freely rotatable about horizontal axes, and means for mounting said rollers upon the supporting members to turn bodily about vertical axes.

3. In sheet glass handling apparatus, means for supporting a moving ribbon of glass and carrying it forwardly, means for cutting the ribbon transversely into individual sheets, and vertically movable means for lifting the sheet out of engagement with said supporting means and for supporting the same, said vertically movable means including a plurality of rollers rotatable about horizontal axes, and means for mounting said rollers to turn bodily about vertical axes to facilitate horizontal rotation of the sheet when supported thereupon.

4. In sheet glass handling apparatus, means for supporting a moving ribbon of glass and carrying it forwardly, means for cutting the ribbon transversely into individual sheets, and vertically movable means for raising the sheet out of engagement with said supporting means and for supporting the same, said vertically movable means including a plurality of supporting members arranged transversely beneath said first mentioned supporting means, a plurality of rollers carried by each supporting member and freely rotatable about horizontal axes, means for mounting said rollers upon said supporting member to turn bodily about vertical axes, and means for raising and lowering the supporting member and rollers carried thereby.

5. In sheet glass handling apparatus, means for supporting a sheet of glass, auxiliary sheet supporting means normally positioned beneath the level of the first mentioned supporting means, and means for effecting relative vertical movement between said first and second mentioned supporting means so as to transfer the sheet from the former to the latter, said second named supporting means including a plurality of sheet supporting elements, and means for mounting said elements to rotate approximately 180 degrees so that the sheet may be horizontally rotated while supported thereupon.

6. In sheet glass handling apparatus, means for supporting a sheet of glass, auxiliary sheet supporting means normally positioned beneath the level of the first mentioned supporting means, and means for effecting relative vertical movement between said first and second mentioned supporting means so as to transfer the sheet from the former to the latter, said second named supporting means including a plurality of supporting elements, and means for mounting said elements to turn about substantially vertical axes so that the sheet may be horizontally rotated while supported thereupon.

EDWARD G. GREEN.